(12) United States Patent
Touchi

(10) Patent No.: US 9,007,740 B2
(45) Date of Patent: Apr. 14, 2015

(54) ROTARY CAPACITOR

(71) Applicant: Sumitomo Heavy Industries, Ltd., Tokyo (JP)

(72) Inventor: Yutaka Touchi, Niihama (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 109 days.

(21) Appl. No.: 13/754,199

(22) Filed: Jan. 30, 2013

(65) Prior Publication Data

US 2013/0194713 A1 Aug. 1, 2013

(30) Foreign Application Priority Data

Jan. 31, 2012 (JP) ................................ 2012-018828

(51) Int. Cl.
| | | |
|---|---|---|
| *H01G 5/06* | (2006.01) | |
| *H01G 5/04* | (2006.01) | |
| *H01G 5/16* | (2006.01) | |
| *H05H 13/02* | (2006.01) | |
| *H05H 13/00* | (2006.01) | |

(52) U.S. Cl.
CPC . *H01G 5/16* (2013.01); *H01G 5/06* (2013.01); *H05H 13/02* (2013.01); *H05H 13/005* (2013.01)

(58) Field of Classification Search
CPC ............. H01G 5/06; H01G 4/38; H01G 5/01; H01G 5/38; H01G 5/12
USPC ................................................ 361/298.1, 292
See application file for complete search history.

(56) References Cited

U.S. PATENT DOCUMENTS 3,702,467 A * 11/1972 Melnyk ..................... 340/870.37
4,755,731 A * 7/1988 Anthony et al. ............... 318/662
4,862,752 A * 9/1989 Hoyt ......................... 73/862.326

FOREIGN PATENT DOCUMENTS

JP 2008507826 A 3/2008

* cited by examiner

*Primary Examiner* — Eric Thomas
*Assistant Examiner* — Arun Ramaswamy
(74) *Attorney, Agent, or Firm* — Squire Patton Boggs (US) LLP

(57) ABSTRACT

A rotary capacitor which changes electrostatic capacity by changing a mutually opposite area of a pair of electrodes which opposes each other, includes a rotary shaft which can rotate around a central axis, wherein the pair of electrodes includes a first electrode plate which protrudes from a circumferential surface of the rotary shaft, and a second electrode plate which may be separated in a direction along the central axis with respect to the first electrode plate and may be disposed so as to oppose the first electrode plate, and a notch which penetrates in a plate thickness direction may be formed on an edge portion of the first electrode plate.

1 Claim, 10 Drawing Sheets

ROTARY CAPACITOR

RELATED APPLICATION

Priority is claimed to Japanese Patent Application No. 2012-018828, filed Jan. 31, 2012, the entire content of each of which is incorporated herein by reference.

BACKGROUND

1. Technical Field

The present invention relates to a rotary capacitor which changes electrostatic capacity by changing a mutually opposite area of a pair of electrodes.

2. Description of the Related Art

In the related art, a rotary capacitor includes a blade plate (a first electrode) which rotates around a predetermined shaft and an opposite electrode (a second electrode) which is disposed so as to oppose the blade plate as a pair of electrodes. In the rotary capacitor, the blade plate is rotated around the predetermined shaft, the mutually opposite area of the pair of electrodes is changed, and thus, electrostatic capacity is changed.

SUMMARY

According to an embodiment of the present invention, there is provided a rotary capacitor which changes electrostatic capacity by changing a mutually opposite area of a pair of electrodes which opposes each other, including: a rotary shaft which can rotate around a central axis, wherein the pair of electrodes includes: a first electrode plate which protrudes from a circumferential surface of the rotary shaft; and a second electrode plate which is separated in a direction along the central axis with respect to the first electrode plate and is disposed so as to oppose the first electrode plate, and wherein a notch which penetrates in a plate thickness direction is formed on an edge portion of the first electrode plate.

In addition, according to another embodiment of the present invention, there is provided a rotary capacitor which changes electrostatic capacity by changing a mutually opposite area of a pair of electrodes which opposes each other, including: a rotary shaft which can rotate around a central axis, wherein the pair of electrodes includes: a first electrode plate which protrudes from a circumferential surface of the rotary shaft; and a second electrode plate which is separated in a direction along the central axis with respect to the first electrode plate and is disposed so as to oppose the first electrode plate, and the first electrode includes an electrode plate main body which is formed of an insulator, and wherein a surface layer which is formed of a conductor which covers the surface of the second electrode plate side of the electrode plate main body.

According to still another embodiment of the present invention, there is provided a rotary capacitor which changes electrostatic capacity by changing an overlapped area of a pair of electrodes which opposes each other, including: a rotary shaft which can rotate around a central axis, wherein the pair of electrodes includes: a first electrode plate which protrudes from a circumferential surface of the rotary shaft; and a second electrode plate which is separated in a direction along the central axis with respect to the first electrode plate and is disposed so as to oppose the first electrode plate, and wherein a thinned portion in which the thickness is thinner than the thickness of a center portion is formed on an edge portion of the first electrode plate.

DETAILED DESCRIPTION

Figure 1:
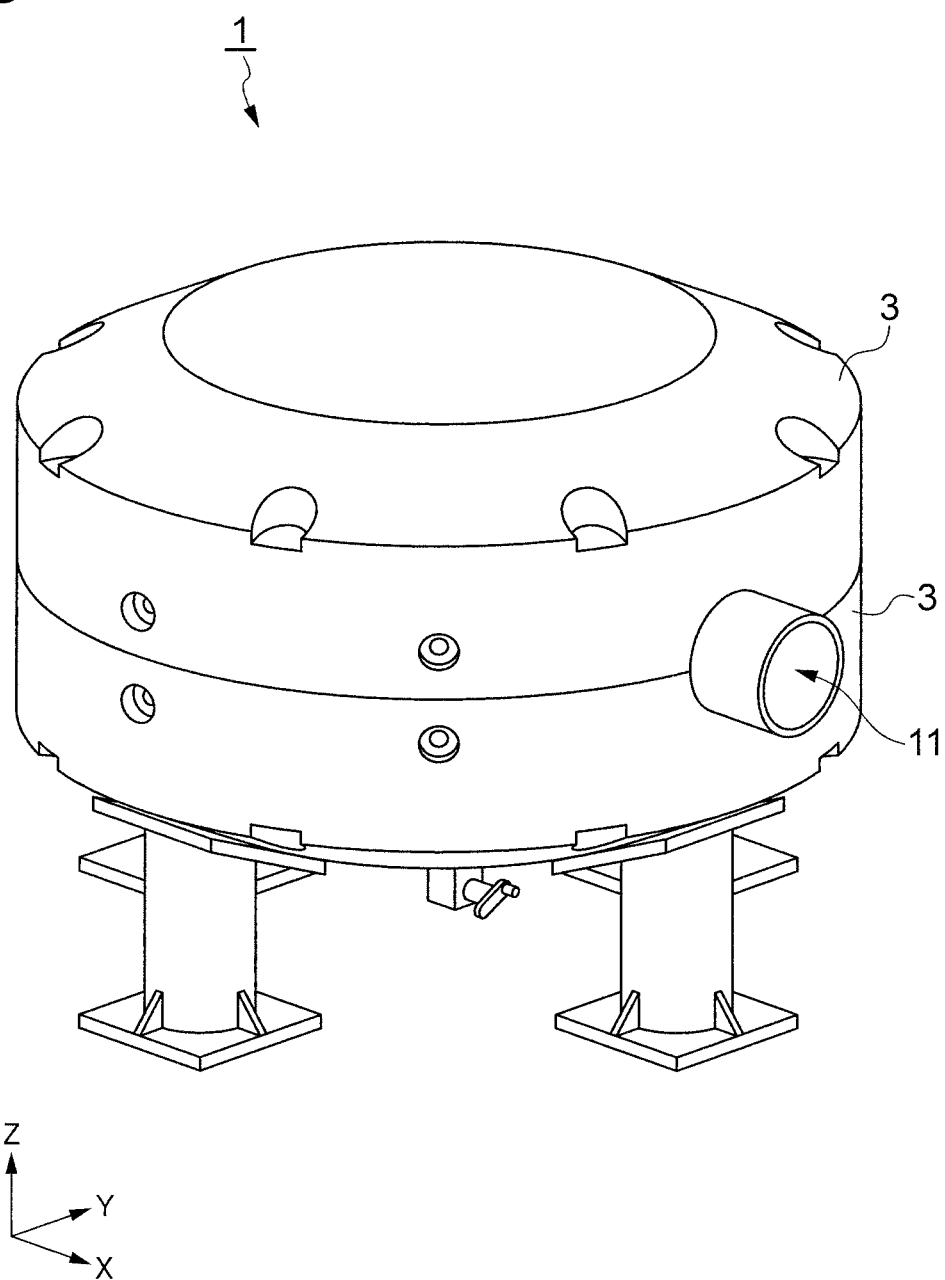
FIG. 1 is a perspective view showing a synchrocyclotron which includes a rotary capacitor according to an embodiment of the present invention.
Figure 2:
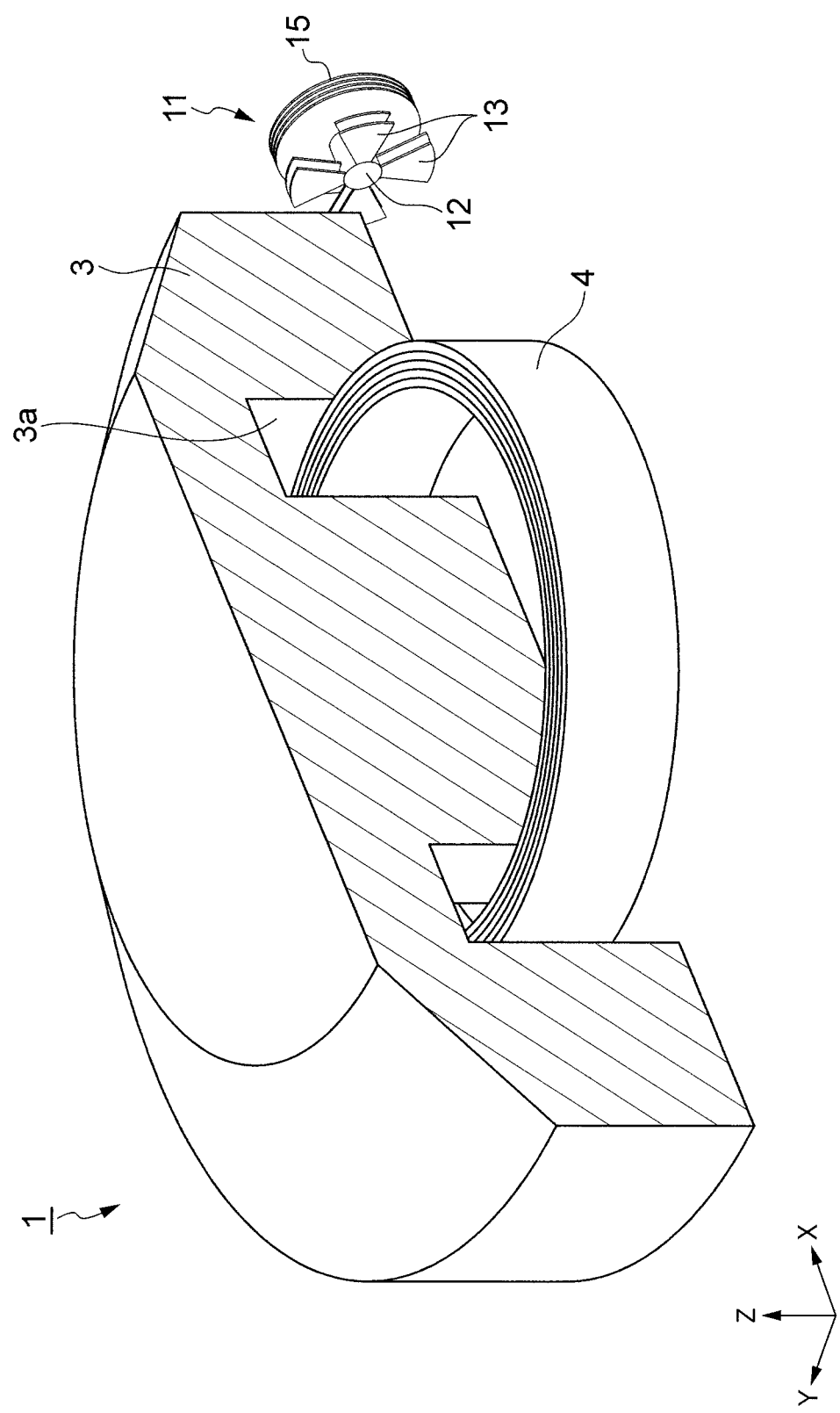
FIG. 2 is a view showing a yoke which is disposed in the synchrocyclotron shown in FIG. 1, and the rotary capacitor which is disposed on the outer surface side of the yoke.
Figure 3:
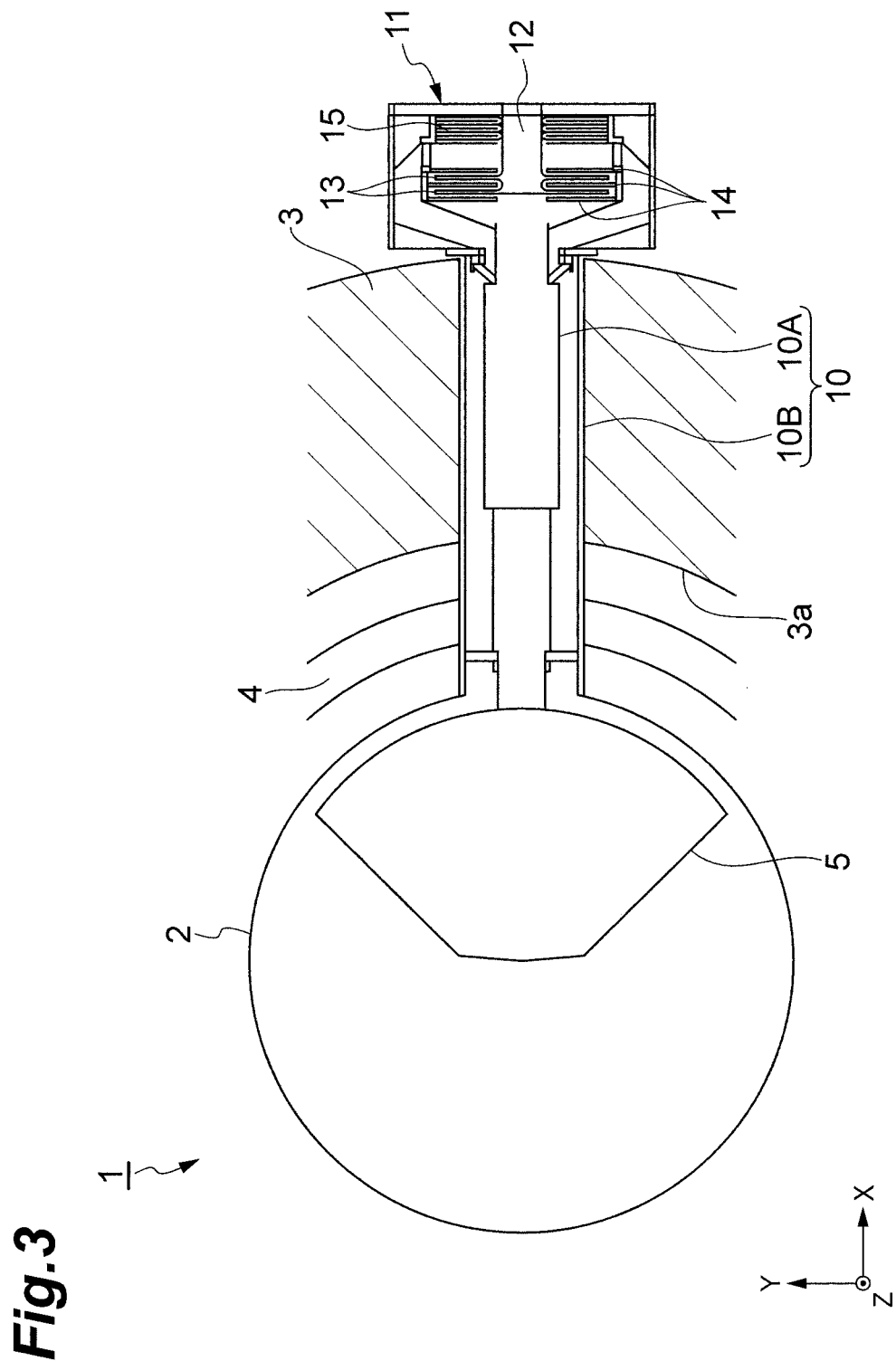
FIG. 3 is a cross-sectional view showing an acceleration electrode in the synchrocyclotron shown in FIG. 1 and a rotary capacitor which is connected to the acceleration electrode.
Figure 4:
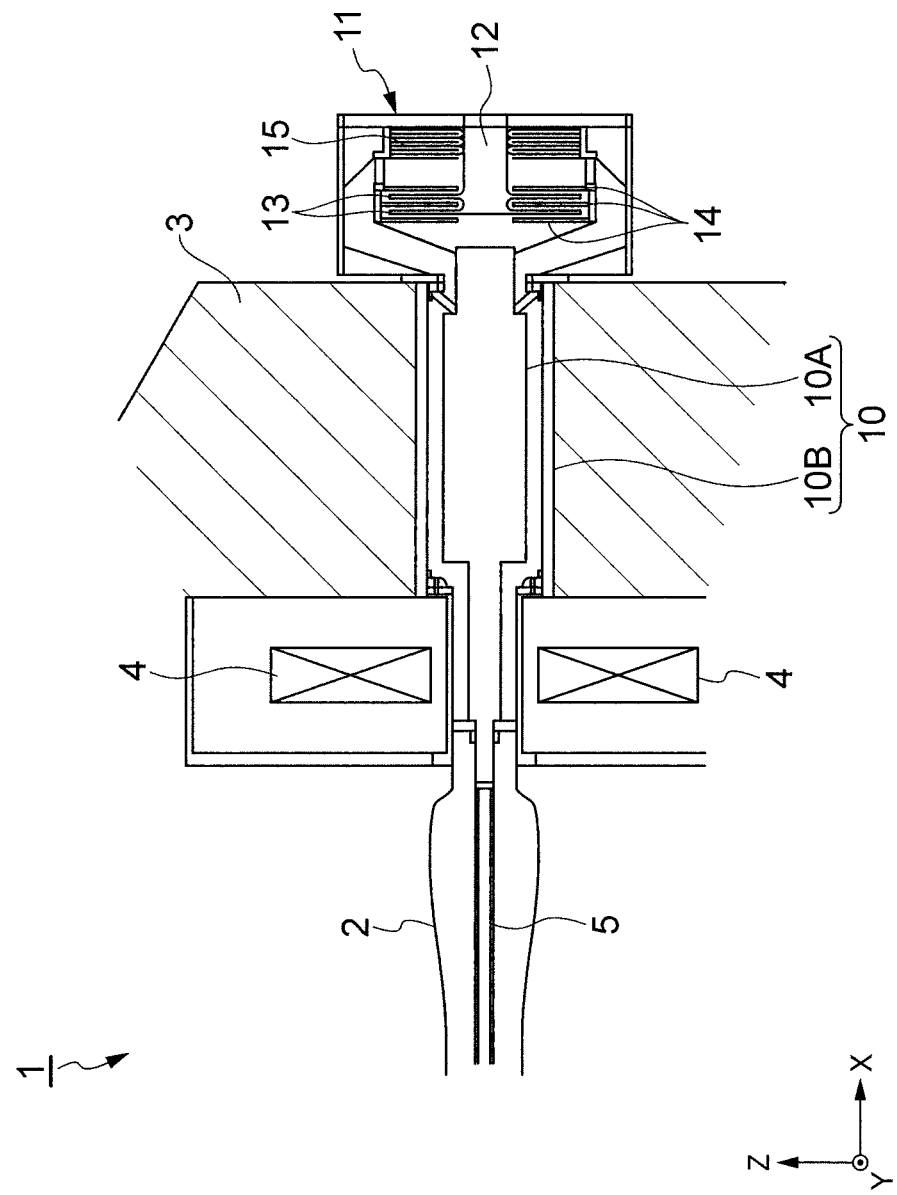
FIG. 4 is a cross-sectional view showing the acceleration electrode in the synchrocyclotron shown in FIG. 1 and a rotary capacitor which is connected to the acceleration electrode.

For example, it is considered that a synchrocyclotron is applied to a proton beam (a charged particle beam) treatment. In the synchrocyclotron which can be applied to the proton beam treatment, high output characteristics of the emitted proton beam are required, and an increase in a magnetic field is necessary to accelerate the charged particles. The synchrocyclotron includes a variable capacitor (rotary capacitor) for modulating a resonant frequency of high-frequency power which is supplied to an acceleration electrode. In order to increase high output characteristics of the beam, an increase in speed of a blade plate of the rotary capacitor is needed, and thereby, new problems that need to be solved occur.

For example, in a case where the rotary capacitor is used at high speed in a circumference where a strong magnetic field is generated, when the blade plate which is a conductor moves in the magnetic field, eddy currents flow to the blade plate, and thus, the blade plate is heated. Particularly, when the blade plate is rotated at high speed, since a heating value is increased, it is required to suppress the heat generation.

Therefore, it is desirable to provide a rotary capacitor capable of suppressing the heat generation by decreasing the eddy currents which flow in the blade plate.

According to an embodiment of the present invention, since a notch which penetrates in a plate thickness direction is formed on a first electrode plate, pathways of the eddy currents which flow in the first electrode plate are impeded due to the notch. Thereby, the eddy currents which flow in the first electrode plate are decreased, and thus, it is possible to suppress the heat generation.

In addition, the first electrode plate may include a lateral side which extends toward the circumferential surface of the rotary shaft, and the notch may be formed to be plural in an extension direction of the lateral side which is the edge portion of the first electrode plate. Since the eddy currents tend to flow to the vicinity of the lateral side rather than the center portion, due to the fact that the notches are provided on the lateral side of the first electrode plate, and thus, it is possible to effectively decrease the flow of the eddy currents. Moreover, since the plurality of notches are provided in the extension direction of the lateral side, the pathways of the eddy currents are extended, and thus, a structure in which the eddy currents do not easily flow can be provided.

According to another embodiment of the present invention, since a surface layer which is formed of a conductor is formed on a surface of an electrode plate main body which is formed of an insulator, the eddy currents flow to the surface layer, and thus, eddy currents which flow to the electrode plate main body can be decreased. Thereby, the eddy currents which flow in the first electrode plate are decreased, and it is possible to suppress the heat generation.

In addition, according to still another embodiment of the present invention, since a thinned portion in which the thickness is thinner than the thickness of the center portion is formed on the edge portion of the first electrode plate, it is possible to make the eddy currents hard to flow. Thereby, it is possible to decrease the eddy currents which flow in the first electrode plate. Therefore, it is possible to suppress the heat generation by decreasing the eddy currents which flow in the first electrode plate.

Moreover, as described above, since the heat generation can be suppressed, it is possible to improve rotational speed of the rotary capacitor.

Hereinafter, a preferred embodiment of a particle accelerator according to an embodiment of the present invention will be described with reference to the drawings. Moreover, in the descriptions of drawings, the same reference numerals are attached to the same or corresponding elements, and overlapped descriptions are omitted. In addition, a positional relationship such as left, right, up, and down is based on the positional relationship of the drawing. In the present embodiment, a case where a rotary capacitor is applied to a synchrocyclotron is described.

Synchrocyclotron

A synchrocyclotron 1 shown in FIGS. 1 to 4 accelerates ions (positive ions of hydrogen) and emits proton beams (charged particle beams). That is, the synchrocyclotron 1 accelerates ions (positive ions of hydrogen) which are supplied from an ion source (not shown) inside a vacuum vessel 2 (refer to FIGS. 3 and 4) and emits the proton beams.

The synchrocyclotron 1 includes a pair of iron cores 3 (yoke) which is disposed so as to vertically oppose each other, a coil 4 (electromagnet) for generating a magnetic field in the iron core 3, and an accelerator electrode 5 (dee electrode) for accelerating ions inside the vacuum vessel 2. Moreover, in FIG. 2, only the upper iron core 3 of the pair of upper and lower iron cores 3 is shown.

A ring shaped space 3a is formed in the iron core 3, and the coil 4 is accommodated inside the space 3a. The vacuum vessel 2 (vacuum chamber) is disposed inside the coil 4. A current flows to the coil 4, and thus, a magnetic field which passes through the vacuum vessel 2 in a vertical direction Z is formed, and the magnetic field passing through the vacuum vessel 2 is returned to the original through the iron core 3 outside the coil 4.

Figure 5:
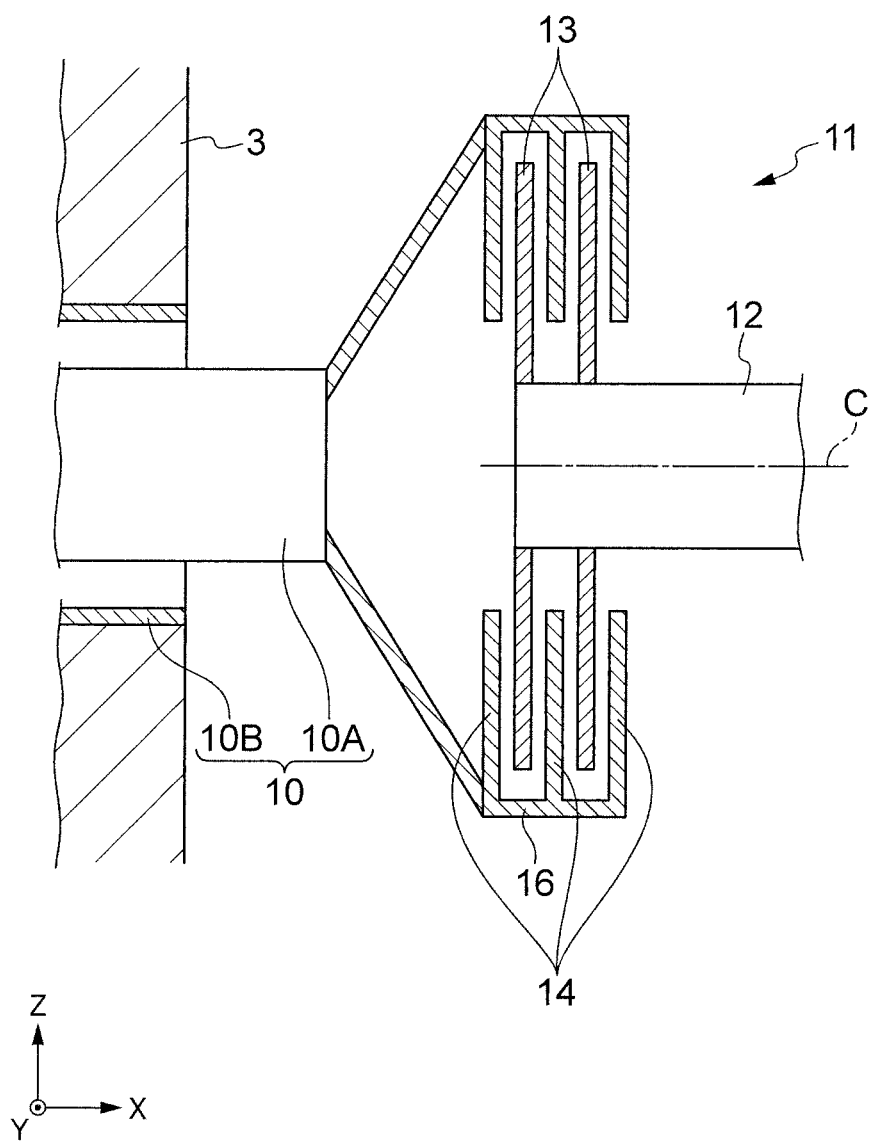
FIG. 5 is a cross-sectional view along a rotational axial direction of the rotary capacitor.

A resonance circuit 10 for modulating the resonant frequency of high-frequency power from a high-frequency power source (not shown) is connected to the acceleration electrode 5. FIG. 5 is a cross-sectional view showing the resonance circuit 10 and the rotary capacitor 11. The resonance circuit 10 includes an inner conductor 10A which is electrically connected to the acceleration electrode 5 and an outer conductor 10B which is disposed outside the inner conductor 10A. The outer conductor 10B is formed in a tubular shape, and the inner conductor 10A is inserted into the inner portion of the outer conductor 10B.

The resonance circuit 10 is electrically connected to the rotary capacitor 11 (variable capacitor) which changes electrostatic capacity. The rotary capacitor 11 includes a rotary shaft 12 which is rotatably provided around a central axis C, a plurality of rotary blades 13 (first electrode plate) which are mounted on the rotary shaft 12 so as to protrude from a circumferential surface 12a of the rotary shaft 12, and a fixed electrode 14 (second electrode plate) which is disposed so as to oppose the rotary blades 13.

The rotary shaft 12 may be formed of copper, aluminum, or the like. The rotary shaft 12 is rotatably supported around the central axis C by a rotational driving portion (not shown). A rotational driving force is transmitted from the rotational driving portion (for example, an electric motor) to the rotary shaft 12, and the rotary shaft is rotated at a predetermined rotational speed.

Figure 6:
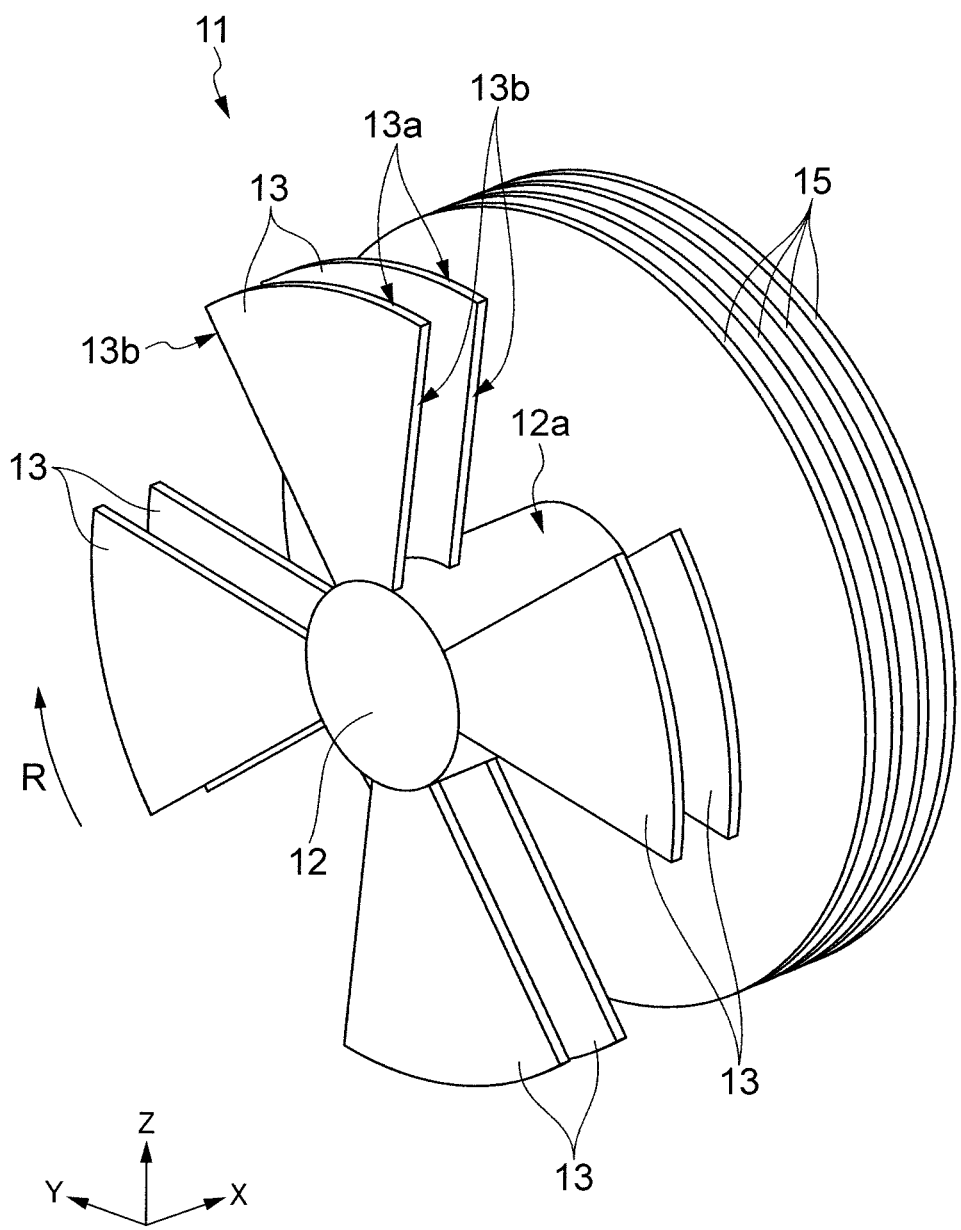
FIG. 6 is a perspective view showing a rotary capacitor according to an embodiment of the present invention.

For example, the rotary blade 13 may be formed of a plate material such as copper or aluminum. For example, the rotary blade 13 is formed in a fan shape in the front view (when viewed from the direction along the central axis C of the rotary shaft 12). As shown in FIG. 6, the rotary blade 13 includes an arc-shaped outer circumferential portion 13a, and a pair of lateral sides 13b and 13b which is bent from both ends of the outer circumferential portion 13a and extends toward the circumferential surface 12a of the rotary shaft 12.

Moreover, the shape of the rotary blade 13 may be another shape. The shape of the rotary blade 13 may include a trapezoidal shape, an elliptical shape, a triangular shape, or the like. Moreover, the edge portions (outer circumferential portions 13a and lateral sides 13b) of the rotary blade 13 may be linearly formed or may be curvedly formed.

As shown in FIG. 6, for example, the rotary capacitor 11 of the present embodiment includes a plurality of sets of rotary blades 13 in which four blades are set as one set. In the circumferential direction (rotating direction R) of the rotary shaft 12, one set of rotary blades 13 is configured by a plurality of rotary blades 13 which are disposed at an equal interval (for example, the interval of 90°). The one set of rotary blades 13 is disposed at a predetermined interval in the direction along the central axis C of the rotary shaft 12. The rotary blade 13 is disposed in one end side (iron core 3 side) of the rotary shaft 12. A plurality of grounding electrodes 15 (earth electrode) are provided in the other end side of the rotary shaft 12. Moreover, the one set of rotary blades 13 is not limited to the configuration in which four blades are set as one set, and may include a configuration in which other number of blades (for example, three or five blades) is set as one set. In addition, in the one set of rotary blades 13, the plurality of rotary blades 13 are not limited to the configuration in which the blades are disposed at an equal interval in the circumferential direction of the rotary shaft 12, and may be disposed at different intervals (for example, intervals in the order of 80°, 100°, 80°, and 100° when four blades are set as one set).

Figure 7:
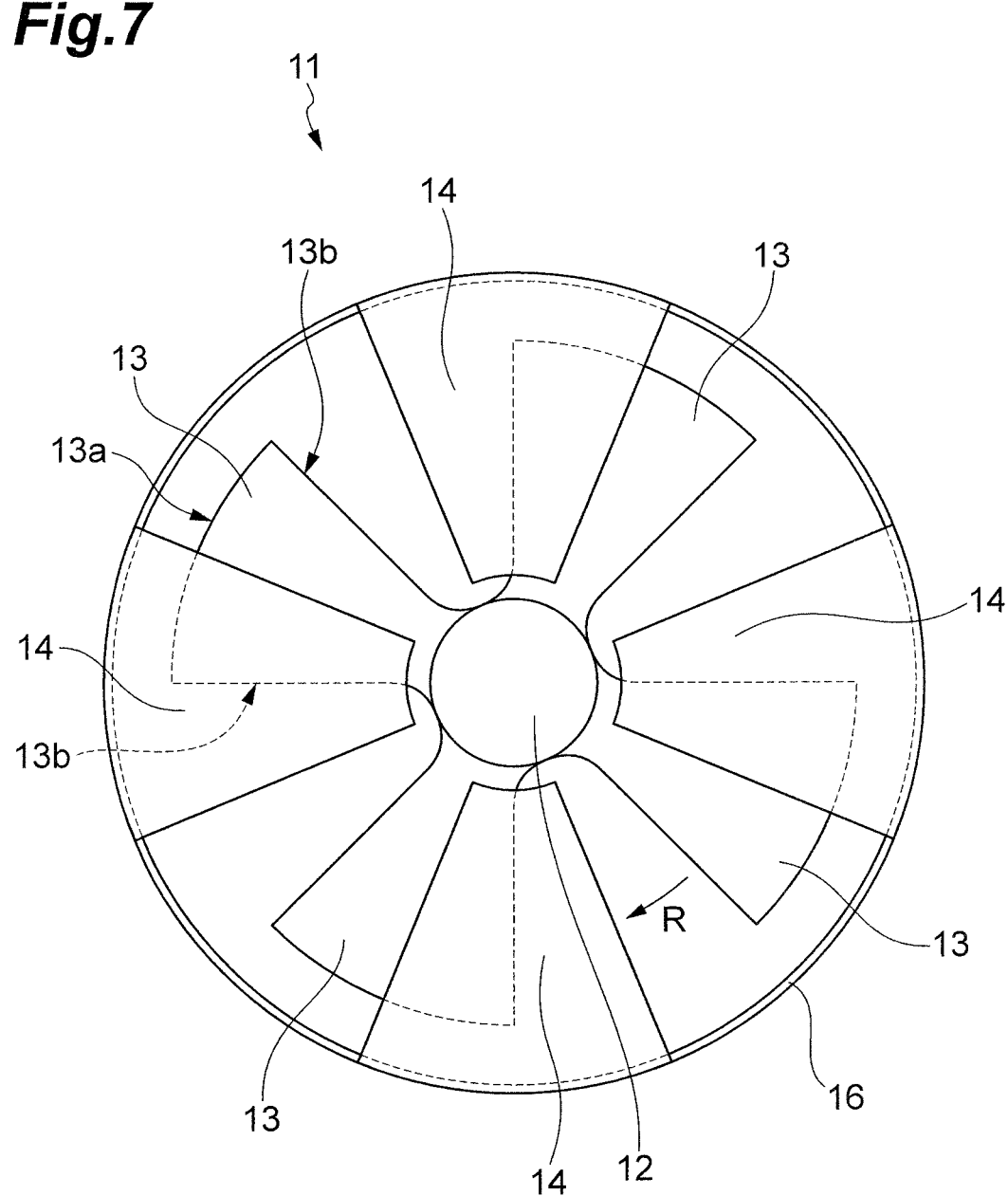
FIG. 7 is a front view in the axial direction of the rotary capacitor according to the embodiment of the present invention.

For example, the fixed electrode 14 shown in FIG. 7 may be formed of a plate material such as copper or aluminum. For example, the fixed electrode 14 is formed in a fan shape in the front view (when viewed from the direction along the central axis C). As shown in FIG. 5, the fixed electrode 14 is fixed to a tubular portion 16 so as to protrude toward the central axis C from the inner circumferential surface (inner surface) of the tubular portion 16 which is provided so as to enclose the rotary blade 13. In addition, the tubular portion 16 is connected to the inner conductor 10A, and for example, may be formed of copper or aluminum. The fixed electrode 14 may be fixed to the tubular portion 16 using welding, brazing, or the like, and may be integrally formed with the tubular portion 16.

For example, in the rotary capacitor 11 of the present embodiment, a plurality of sets of fixed electrodes 14 in which four electrodes 14 are set as one set are provided. One set of fixed electrodes is disposed at an equal interval (for example, the interval of 90°) in the circumferential direction R of the rotary shaft 12. The one set of fixed electrodes 14 is disposed at a predetermined interval in the direction along the central axis C. The plurality of fixed electrodes 14 are connected to the tubular portion 16 in the outer circumferential portion, and thus, are electrically connected to each other. Moreover, the one set of fixed electrodes 14 is not limited to the configuration in which four electrodes are set as one set, and may include a configuration in which other number of electrodes (for example, three or five electrodes) is set as one set. In addition, in the one set of fixed electrode plates 14, the plurality of fixed electrode plates 14 are not limited to the configuration in which the electrode plates are disposed at an equal interval in the circumferential direction of the rotary shaft 12, and may be disposed at different intervals (for example, intervals of 80°, 100°, 80°, and 100° in the order when four electrode plates are set as one set).

The rotary blade 13 and the fixed electrode 14 are provided so as to be separated in the direction along the central axis C, and function as a pair of electrodes which opposes each other. The rotary blades 13 move in the rotating direction R according to the rotation of the rotary shaft 12. The rotary blades 13 are rotated, and thus, a mutually opposite area (an area of a portion in which one rotary blade 13 and one fixed electrode 14 are overlapped when viewed from the direction along the central axis C) of the pair of electrodes (the pair of electrodes which is configured by one rotary blade 13 and one fixed electrode 14) is changed. The electrostatic capacity of the rotary capacitor 11 can be changed by changing the area in which the pair of electrodes 13 and 14 is overlapped.

Figure 8:
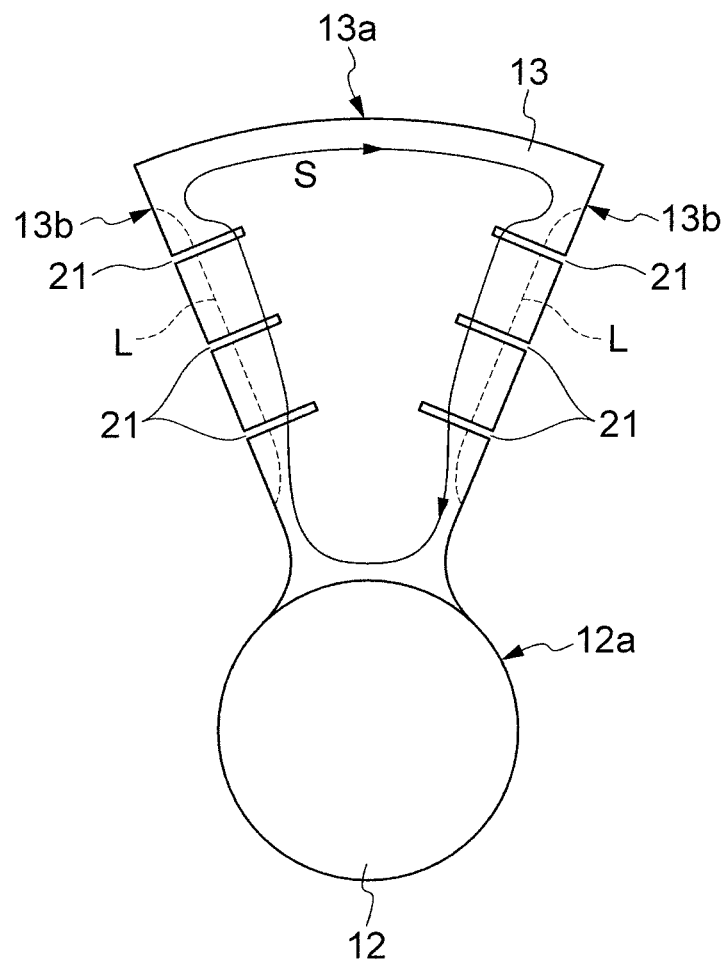
FIG. 8 is a front view showing a rotary blade of the rotary capacitor.

Here, as shown in FIG. 8, a plurality of notches are provided in the lateral sides 13b (edge portions) of the rotary blade 13. The notches 21 penetrate in the plate thickness direction, and for example, are formed in a rectangular shape (when viewed from the plate thickness direction) in a plan view. Moreover, the notches 21 extend from the lateral sides 13b to the center portion side of the rotary blade 13. In addition, for example, the notches 21 are disposed at a predetermined interval in the extension directions of the lateral sides 13b. The predetermined interval means that an interval is provided, and the specific length of the interval is not limited. The intervals between the plurality of notches 21 may be equal to each other or may be different from each other. Moreover, in FIG. 8, only one rotary blade 13 is shown. However, similar notches 21 may also be provided in all the other rotary blades 13, or similar notches 21 may be provided only in other partial rotary blades 13. Moreover, in FIGS. 6 and 7, the illustration of the notches 21 is omitted. In FIG. 8, the notches 21 are exaggeratedly shown, and in practice, the notches 21 extend by approximately 20 to 30 mm toward the center portion side of the rotary blade 13 from the lateral sides 13b, and the widths of the notches 21 are approximately 1 to 2 mm.

The shape of the notch 21 is not limited to a rectangular shape, and may have other shapes. For example, the shape of the notch 21 includes a V shape, a U shape, a semicircular shape, or the like. Moreover, the positions, the dimensions, and the number of the notches 21 may be appropriately changed. For example, the notches 21 may be formed on the edge portion of the outer circumferential surface 13a side of the rotary blade 13. Moreover, the opening width of the notch 21 is not particularly limited.

Next, an operation of the synchrocyclotron 1 which includes the rotary capacitor 11 will be described. Ions supplied from the ion source exist inside the vacuum vessel 2 of the synchrocyclotron 1. Alternating current power is supplied to the coil 4 from an alternating current power source, and a predetermined magnetic field is formed inside the iron core 3. A magnetic field passing through in the vertical direction Z is formed inside the vacuum vessel 2.

High-frequency power is supplied to the acceleration electrode 5 inside the vacuum vessel 2 from a high frequency power source. The resonant frequency of high-frequency power is modulated due to the resonance circuit 10 which is connected to the high frequency power source. For example, the rotary shaft 12 of the rotary capacitor 11 is rotated at 12,600 rpm. In the rotary capacitor 11, electrostatic capacity is changed by changing the mutually opposite area of the rotary blade 13 and the fixed electrode 14. Thereby, the modulation of the resonant frequency is performed due to the resonance circuit 10, and a predetermined high-frequency power is supplied to the acceleration electrode 5.

In the synchrocyclotron 1, the resonant frequency is decreased in accordance with an increase in the weight of the ions, and the ions are accelerated. Thereby, it is possible to avoid a period delay which is generated due to the increase in energy of the ions. Therefore, the ions are appropriately accelerated, and the accelerated ions are emitted outside the vacuum vessel 2 after the energy of ions reaches a predetermined value or more. As a result, in the synchrocyclotron 1, a beam current having high strength can be obtained.

Moreover, during the use of the synchrocyclotron 1, a magnetic flux is leaked from the iron core 3 to air. The rotary capacitor 11 is disposed in the outer surface side of the iron core 3, and receives the influence of a magnetic field (component in an X direction) due to the leaked magnetic flux. Thereby, the eddy currents S (refer to FIG. 8) are generated in the rotary blade 13 which moves in the magnetic field. The eddy currents S formed in the rotary blade 13 flow along the edge portions (outer circumferential portion 13 and lateral sides 13b).

In the rotary capacitor 11 of the present embodiment, since notches 21 are formed on the lateral sides 13b of the rotary blade 13, pathways of the eddy currents S which flow in the rotary blade 13 are impeded due to the notches 21. Thereby, the eddy currents S are formed so as to avoid the notches 21, and the eddy currents S do not easily flow. As a result, the eddy currents S which flow in the rotary blade 13 are decreased, and thus, it is possible to suppress heat generation of the rotary capacitor 11.

In the rotary capacitor 11, since the heat generation is suppressed, the rotary blade 13 is rotated at high speed, and thus, it is possible to appropriately modulate the resonant frequency of the synchrocyclotron 1. As a result, acceleration of the ions can be appropriately performed, and it is possible to stably achieve illumination of the proton beams.

Moreover, FIG. 8 shows analysis results of the Lorentz force density in a case where the notches 21 are not formed in the lateral sides 13b (edge portion). In FIG. 8, a range shown by a broken line L (a range which is interposed between the broken line L and the lateral sides 13b) is an area where the Lorentz force density is higher compared to the periphery. The notches 21 can be formed in the area in which the Lorentz force density is high. Thereby, it is possible to effectively suppress the flow of the eddy currents.

Figure 9:
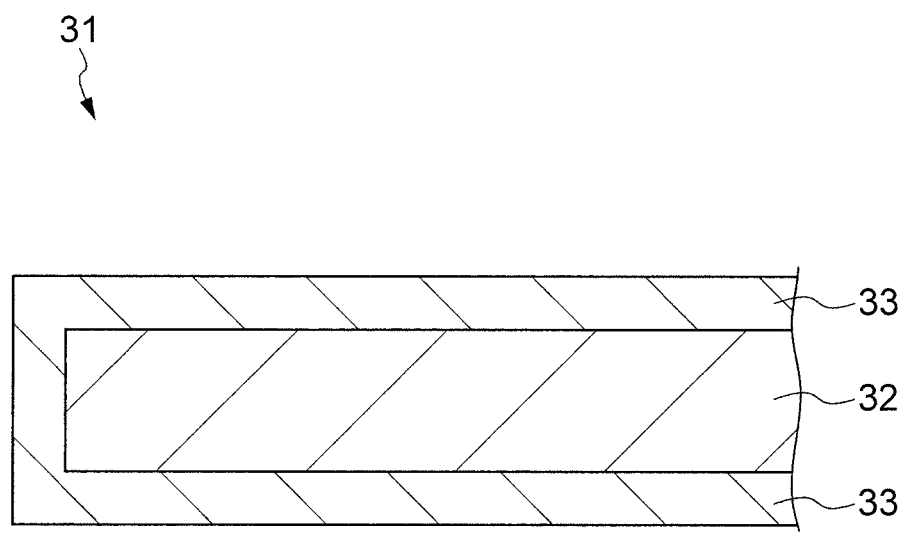
FIG. 9 is a cross-sectional view showing a rotary blade of a rotary capacitor according to another embodiment of the present invention.

Next, a rotary capacitor according to another embodiment of the present invention will be described. FIG. 9 is a cross-sectional view showing a rotary blade 31 of the rotary capacitor according to another embodiment of the present invention. The rotary capacitor of another embodiment is different from the rotary capacitor 11 of the embodiment in that the rotary blade 31 having a laminated structure is provided instead of the rotary blade 13 in which the notches 21 are formed in the lateral sides 13b.

The rotary blade 31 includes an electrode plate main body 32 which is formed of an insulator and a surface layer 33 which is formed of a conductor which covers the surface of the electrode plate main body 32. For example, ceramics may be used as the electrode plate main body 32. In addition, a stainless steel or the like may be exemplified as the insulator which can be used for the electrode plate main body 32.

For example, copper may be used as the material of the surface layer 33. The surface layer 33 can be formed by performing a copper plating on the surface of the electrode plate main body 32. For example, the surface layer 33 is thinly formed so as to be approximately 20 to 30 µm. Moreover, the conductor material other than copper may be used as the material of the surface layer.

In the rotary capacitor according to another embodiment, since stiffness is secured due to the electrode plate main body 32 which is formed of an insulator, a necessary high-frequency current flows using the surface layer 33 which is formed of a conductor, and the surface layer 33 is thinly formed, it is possible to suppress the eddy currents by increasing resistance. As a result, it is possible to suppress the heat generation of the rotary capacitor. Moreover, the notches 21 may be formed on the rotary blade 31 having the laminated structure. Moreover, the surface layer 33 may be formed on the entire region of the outer surface of the electrode plate main body 32, and may be formed so as to cover only a portion of the outer surface of the electrode plate main body 32. For example, the surface layer 33 may be configured so as to be formed to cover only the surface of the fixed electrode 14 side of the electrode plate main body 32 (to cover only the surface which opposes the fixed electrode 14).

Figure 10:
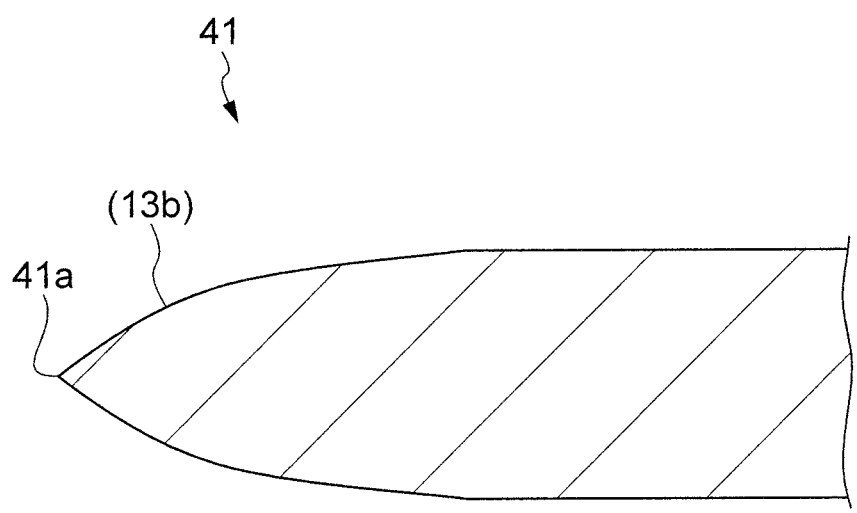
FIG. 10 is a cross-sectional view showing a rotary blade of a rotary capacitor according to still another embodiment of the present invention.

Next, a rotary capacitor according to still another embodiment of the present invention will be described. FIG. 10 is a cross-sectional view showing an edge portion of a rotary blade of the rotary capacitor according to still another embodiment of the present invention. The rotary capacitor of still another embodiment is different from the rotary capacitor 11 of the embodiment in that a rotary blade 41 with thin lateral sides (edge portions) is provided instead of the rotary blade 13 in which notches 21 are formed on the lateral sides 13b.

The thickness of lateral sides (13b) of the rotary blade 41 is thinner than the thickness of the other portions (a center portion of the rotary blade 41). For example, the lateral side is formed so as to be tapered toward a tip portion 41a. As shown in FIG. 10, the lateral side has a shape which is smoothly curved. Moreover, the lateral side may have a shape which is linearly inclined and is tapered, or the lateral side may be thinly formed by forming stepped surfaces.

Moreover, the thinned portion may be formed on the entire circumference of the rotary blade 41, and may be partially formed. For example, the thinned portion may be formed so as to be curved in the plate thickness direction, or the thinned portion may be configured so as to be thinner with steps being provided.

In the rotary capacitor according to still another embodiment, the thinned portion is formed on the lateral sides of the rotary blade 41, and since the resistance of the lateral side portion to which eddy currents easily flow is increased, it is possible to decrease the eddy currents. Thereby, the eddy currents which flow to the rotary blade 41 are decreased, and it is possible to suppress the heat generation.

As described above, embodiments of the present invention are described in detail. However, the present invention is not limited to the above-described embodiments. In the embodiments, the case where the rotary capacitor is applied to the synchrocyclotron (particle accelerator) is described. However, the rotary capacitor can be used in other apparatus or uses. In addition, the particle accelerator is not limited to the synchrocyclotron, and may be a cyclotron or a synchrotron. Moreover, the particle beam (charged particles) is not limited to the proton beam, and may be a carbon beam (a heavy particle beam) or the like. The rotary capacitor can be used in the synchrocyclotron for a medical treatment. However, the rotary capacitor is not limited to the medical treatment, and may be used in other uses.

It should be understood that the invention is not limited to the above-described embodiment, but may be modified into various forms on the basis of the spirit of the invention. Additionally, the modifications are included in the scope of the invention.

What is claimed is:

1. A rotary capacitor which changes electrostatic capacity by changing a mutually opposite area of a pair of electrodes which opposes each other, comprising:
   a rotary shaft which can rotate around a central axis,
   wherein the pair of electrodes includes:
   a first electrode plate which protrudes from a circumferential surface of the rotary shaft; and
   a second electrode plate which is separated in a direction along the central axis with respect to the first electrode plate and is disposed so as to oppose the first electrode plate, and
   wherein a notch which penetrates in a plate thickness direction is formed on an edge portion of the first electrode plate,
   wherein the first electrode plate includes a lateral side which extends toward the circumferential surface of the rotary shaft, and
   the notch is formed to be plural in an extension direction of the lateral side which is the edge portion of the first electrode plate.

* * * * *